United States Patent Office 2,915,540
Patented Dec. 1, 1959

2,915,540

COMPLEXES OF GAMMA GLUTAMYL MONO-ESTERS

Robert W. H. Chang, St. Paul, and Norval G. Barker, Robbinsdale, Minn., assignors to General Mills, Inc., a corporation of Delaware No Drawing. Application June 29, 1955
Serial No. 518,964

6 Claims. (Cl. 260—429.9)

The invention relates to new multivalent metal complexes of gamma glutamyl mono-esters. These esters are particularly useful for reactions involving the ester group, such as ammonolysis, hydrazinolysis, or hydroxylaminolysis to yield glutamine, gamma-glutamyl hydrazide and gamma-glutamyl hydroxamic acid, respectively. The above hydrazide may be converted to glutamine by reaction with Raney nickel. The above hydroxamic acid is useful as a nerve gas antidote.

It is therefore an object of the present invention to provide novel multivalent metal complexes of gamma glutamyl mono-esters.

While the invention is applicable to complexes of multivalent metals in general, including copper, nickel, magnesium, cobalt, calcium, iron, chromium, zinc, aluminum, mercury, and the like, the copper complex is preferred in that copper salts are inexpensive and readily available, and moreover, this complex is insoluble in water. It is thus readily separated from soluble impurities.

The metal complex ties up the amino group and the alpha carboxyl group so that the gamma carboxyl group is available for reaction. Since in the further use of these compounds the ester group is removed, it is apparent that the particular ester group which is present is of little significance. Thus, the purpose of the ester group is to serve as an intermediate which will readily enter into interchange reactions which are not suitable for the free acid group. Thus ammonolysis readily produces the amide group which is difficult to introduce on the free acid group. Accordingly, any ester group may be employed. However, for commercial reasons, simple groups such as methyl, ethyl, propyl, butyl, benzyl and similar aliphatic and aromatic hydrocarbon groups are preferred. For simplicity, the invention will be described with particular reference to the lower aliphatic ester groups.

The ester complexes are formed by esterifying glutamic acid in the usual way and then converting the esters to the multivalent metal complex by reaction with a multivalent metal compound under essentially neutral conditions. For example, the copper complex of the methyl ester may be produced by esterifying glutamic acid with methanol in the presence of HCl as a catalyst. Upon completion of the esterification, the catalyst is removed or neutralized and the ester is converted to the copper complex by reaction in aqueous medium with a copper compound. The copper complex is insoluble in water near neutrality and may readily be separated from any residual salt resulting from the neutralization of the HCl and from any unreacted glutamic acid, whose copper complex is soluble under these conditions.

The copper complex of the methyl ester may then be reacted with ammonia, either under aqeuous or anhydrous conditions to yield the copper complex of glutamine from which free glutamine may be obtained in any suitable way as, for example, by reaction with $H_2S$ to precipitate copper sulfide or by passing the mixture through a bed of ion exchange resin to remove copper ions, followed by evaporation and crystallization.

*Example 1*

Two hundred and fifty-two grams of anhydrous HCl was introduced into 3 liters of absolute methanol in a 5-liter, 3-neck flask equipped with mechanical stirrer, condenser and thermometer. Nine hundred grams of glutamic acid was slowly added into the methanolic HCl solution. The mixture was stirred at 45–50° C. for 4½ hours and allowed to stand at room temperature overnight. The next morning the mixture was neutralized with $NH_4OH$ to pH 7 and allowed to cool under tap water. The solids were removed by filtration. The filtrate was evaporated under reduced pressure until $NH_4Cl$ dropped out of solution and the salt was removed by filtration. The filtrate and the previous solids were combined and dissolved in water. A water suspension of $Cu(OH)_2$, prepared by neutralizing 512 g. of $CuCl_2.2H_2O$ with NaOH, was added to the above solution with stirring and the pH of the mixture was again adjusted to 7 with $NH_4OH$. After cooling under tap water, the bluish solid was removed by filtration, slurried twice with large amounts of water and filtered. The solid was dried in a vacuum oven at 80° C. for 7 hours, and yielded 1020 grams of the copper complex of gamma-methyl-glutamate.

*Example 2*

Four and one-half grams of anhydrous HCl was introduced into 50 ml. of absolute ethanol and 14.7 grams of glutamic acid was added slowly with constant stirring. The mixture was stirred at 45°–50° C. for four hours and allowed to stand at room temperature overnight. The next morning the mixture was neutralized with $NH_4OH$ to pH 7 and a water suspension of $Cu(OH)_2$ was added with constant stirring. The copper complex of gamma-ethyl-glutamate was obtained upon cooling under tap water. It was filtered and washed with water and absolute methanol. The copper complex of gamma-ethyl-glutamate weighed 12 grams after drying.

In place of the copper complex, other multivalent metal complexes may be formed under the same conditions and from other esters as previously described. Some of these metal complexes are water-soluble and, if purification is desired, this may be accomplished by fractional crystallization, extraction with selective solvents, and the like. As an alternative, the glutamic ester may be purified before preparing the metal complex, in which case purification of the complex would be eliminated.

These complexes may be used for ammonolysis, hydroxylaminolysis, hydrazinolysis and similar reactions. For example, they may be subject to ammonolysis either in aqueous ammonium hydroxide or in the presence of liquid ammonia, either with or without a catalyst. The ammonolysis reaction in liquid ammonia may be catalyzed by such ammonium salts as the iodide, bromide, chloride, nitrate, acetate, and the like, p-toluenesulfonic acid, trimethyl amine hydrochloride, trimethyl amine, carboxylic acid type ion exchange resins, formamide and the like. Glutamine may be recovered from the metal complex as described previously.

*Example 3*

One gram of the copper complex of gamma-methyl-glutamate was mixed with 3 ml. of concentrated ammonium hydroxide, at room temperature and allowed to stand overnight. The reaction products were passed through a column of a sulfonic acid exchange resin (Dowex–50, X–8 which is described by the manufacturer, the Dow Chemical Co., as a high-capacity nuclear sulfonic acid cation exchange resin prepared by the sulfonation of the copolymers prepared from a mixture of styrene and divinylbenzene) in the ammonium form to remove copper. The column was then eluted with water to recover the glutamine. The effluent was chromatographed, using phenol-ethanol-water in a 1 to 1 to 1 ratio by volume. The paper chromatogram showed the presence of glutamine, together with smaller amounts of glutamic acid and gamma-methyl-glutamate.

*Example 4*

The copper complex of gamma-methyl-glutamate was mixed with liquid ammonia and the ammonia allowed to evaporate at room temperature overnight. The glutamine thus formed with recovered as described in the preceding example and identified by paper chromatography.

*Example 5*

The copper complex of gamma-methyl-glutamate was reacted with liquid ammonia under 130 lbs. pressure for 2 hours at 32° C. The glutamine was recovered and identified by paper chromatography as previously described.

A series of ammonolyses in liquid ammonia were conducted at atmospheric pressure at about −40° C. with each of the following catalysts: ammonium chloride, ammonium bromide, ammonium nitrate, ammonium acetate, p-toluene sulfonic acid, trimethyl amine, trimethyl amine hydrochloride, tetramethyl ammonium bromide, formamide, a quaternary ammonium exchange resin (Amberlite IRA 400 which is described by the manufacturer, the Rohm & Haas Company, as a strongly basic anion exchange resin composed of quaternary ammonium groups attached to a styrene-divinylbenzene matrix) in the chloride form and Dowex-50 in the ammonium form. In all cases, higher glutamine conversion was obtained as shown by the paper chromatograms.

*Example 6*

One gram of the copper complex of gamma-ethyl-glutamate was mixed with 20 grams of liquid ammonia containing a small amount of ammonium chloride. The ammonia was allowed to evaporate at room temperature for 1½ hours. Water was added, the copper was removed by Dowex-50, and the effluent chromatographed on paper as described in Example 3. The paper chromatogram showed the presence of higher proportions of glutamine than previous examples, with only traces of glutamic acid and gamma-methyl-glutamate.

*Example 7*

Two grams of gamma-methyl-glutamate was dissolved in water and 1.6 grams of $NiCl_2 \cdot 6H_2O$ was added with stirring. The nickel complex of gamma-methyl-glutamate was obtained in the form of a green solution. This solution was adjusted to pH 12 with concentrated ammonium hydroxide and the mixture allowed to stand at room temperature overnight. The solution was then passed through a column of Dowex-50, X-8 in the ammonium form to remove nickel. The effluent was chromatographed on paper; the chromatogram showing the presence of glutamine.

It is preferred to carry out the ammonolysis under anhydrous conditions with acidic catalysts at temperatures in the range of −40° C. to 20° C.

*Example 8*

Five grams of copper complex of gamma-methyl-glutamate was suspended in 30 ml. water and 5 ml. hydrazine hydrate was added. The mixture was stirred at 50° C. for one hour. The mixture was filtered and the filtrate was passed through a column of Dowex-50 resin in the ammonium form to remove copper. The effluent was diluted with isopropanol until the solution turned cloudy. It was cooled to 5° C. for 30 minutes. The solid was filtered and washed with absolute methanol. The first crop after drying gave 3 g. gamma-glutamyl-hydrazide melted at 165–168° C. The yield is about 67%.

We claim as our invention:

1. A multivalent metal complex of a gamma ester of glutamic acid said ester being selected from the group consisting of lower alkyl and benzyl esters and said metal being selected from the group consisting of copper, nickel, magnesium, cobalt, calcium, iron, chromium, zinc, aluminum and mercury.
2. A copper complex of a gamma lower alkyl ester of glutamic acid.
3. A copper complex of gamma-methyl-glutamate.
4. A copper complex of gamma-ethyl-glutamate.
5. A nickel complex of a gamma lower alkyl ester of glutamic acid.
6. A nickel complex of gamma-methyl-glutamate.

References Cited in the file of this patent
UNITED STATES PATENTS
2,561,323    Walker et al. _____ July 17, 1951

OTHER REFERENCES
Li et al.: J.A.C.S., 72, 1891–94, May 1950.
Coleman: J.A.C.S., pp. 2294–5 (1951).
Li et al.: J.A.C.S., 74, 4184–88, Aug. 20, 1952.
Melardi et al.: C.A., 47, 4483c (1953).
Li et al.: J.A.C.S., 76, 221–25, Jan. 5, 1954.
Stracker et al.: C.A., 48, 10937c (1954).